Feb. 18, 1936. J. J. WALSER Re. 19,861

STEREOTYPE PLATEMAKING MACHINE

Original Filed Sept. 3, 1920 7 Sheets-Sheet 1

Grace L. Walser, administratrix of the estate of Joseph J. Walser, deceased.

BY

John D. Morgan

ATTORNEY

STEREOTYPE PLATEMAKING MACHINE

Original Filed Sept. 3, 1920 7 Sheets-Sheet 2

Grace L. Walser,
administratrix of the Estate of Joseph J. Walser, deceased
BY
John D. Morgan
ATTORNEY

STEREOTYPE PLATEMAKING MACHINE

Original Filed Sept. 3, 1920 7 Sheets-Sheet 3

Grace L. Walser, administratrix of the Estate of Joseph J. Walser, deceased
BY
John D. Morgan
ATTORNEY

STEREOTYPE PLATEMAKING MACHINE

Original Filed Sept. 3, 1920 7 Sheets-Sheet 4

Grace L. Walser, administratrix of the Estate of Joseph J. Walser, deceased

BY

John D. Morgan

ATTORNEY

Feb. 18, 1936. J. J. WALSER Re. 19,861

STEREOTYPE PLATEMAKING MACHINE

Original Filed Sept. 3, 1920 7 Sheets-Sheet 5

Grace L. Walser, administratrix of the Estate of James J. Walser deceased

BY

John D. Morgan

ATTORNEY

STEREOTYPE PLATEMAKING MACHINE

Original Filed Sept. 3, 1920 7 Sheets-Sheet 6

Grace L. Walser, Administratrix of the Estate of James J. Walser, deceased

BY John D. Morgan

ATTORNEY

Feb. 18, 1936. J. J. WALSER Re. 19,861
STEREOTYPE PLATEMAKING MACHINE
Original Filed Sept. 3, 1920 7 Sheets-Sheet 7
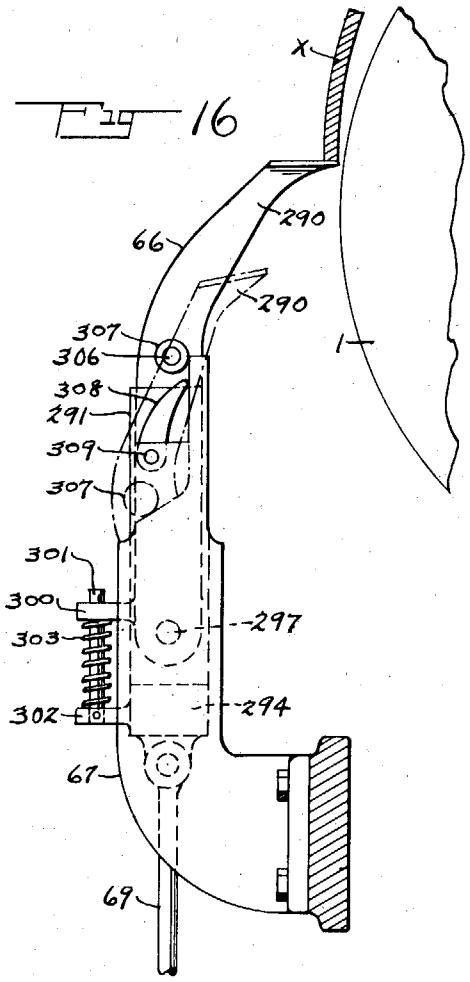
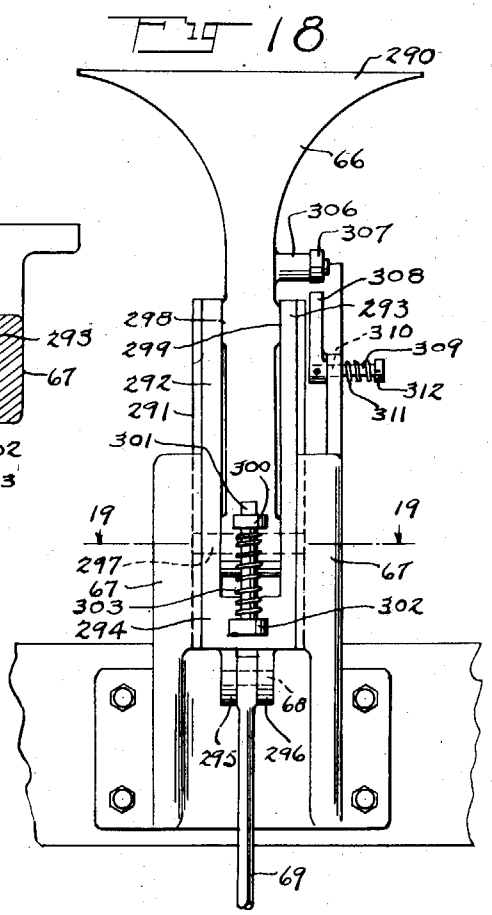
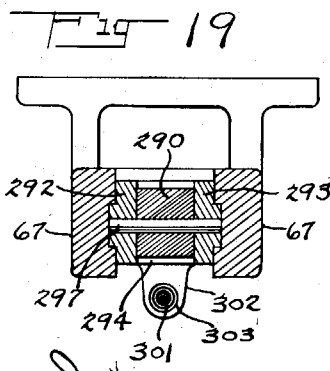
Grace L. Walser administratrix of the Estate of James J. Walser, deceased
By John D. Morgan
ATTORNEY Reissued Feb. 18, 1936

Re. 19,861

UNITED STATES PATENT OFFICE 19,861

STEREOTYPE PLATEMAKING MACHINE

Joseph J. Walser, deceased, late of Ann Arbor, Mich., by The Goss Printing Press Company, assignee, Chicago, Ill., a corporation of Illinois Original application September 3, 1920, Serial No. 407,984. Divided and this application March 15, 1922, Serial No. 543,959. Original No. 1,593,110, dated July 20, 1926. Application for reissue July 6, 1935, Serial No. 30,146

58 Claims. (Cl. 29—21)

The invention relates to machines for making and operating upon stereotype plates, and in certain aspects thereof, the invention relates to a novel machine for casting such plates and finishing them ready to be put on a printing press.

Objects and advantages of the invention will be set forth in part hereinafter and in part will be obvious herefrom, or may be learned by practice with the invention; the same being realized and attained by means of instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 16 is a fragmentary detail in end elevation of the plate lifting mechanism;

Fig. 18 is a side elevation corresponding to Fig. 16 and looking thereat from the left; and Fig. 19 is a transverse horizontal section on line 19—19 of Fig. 18.

Figures 1, 17:
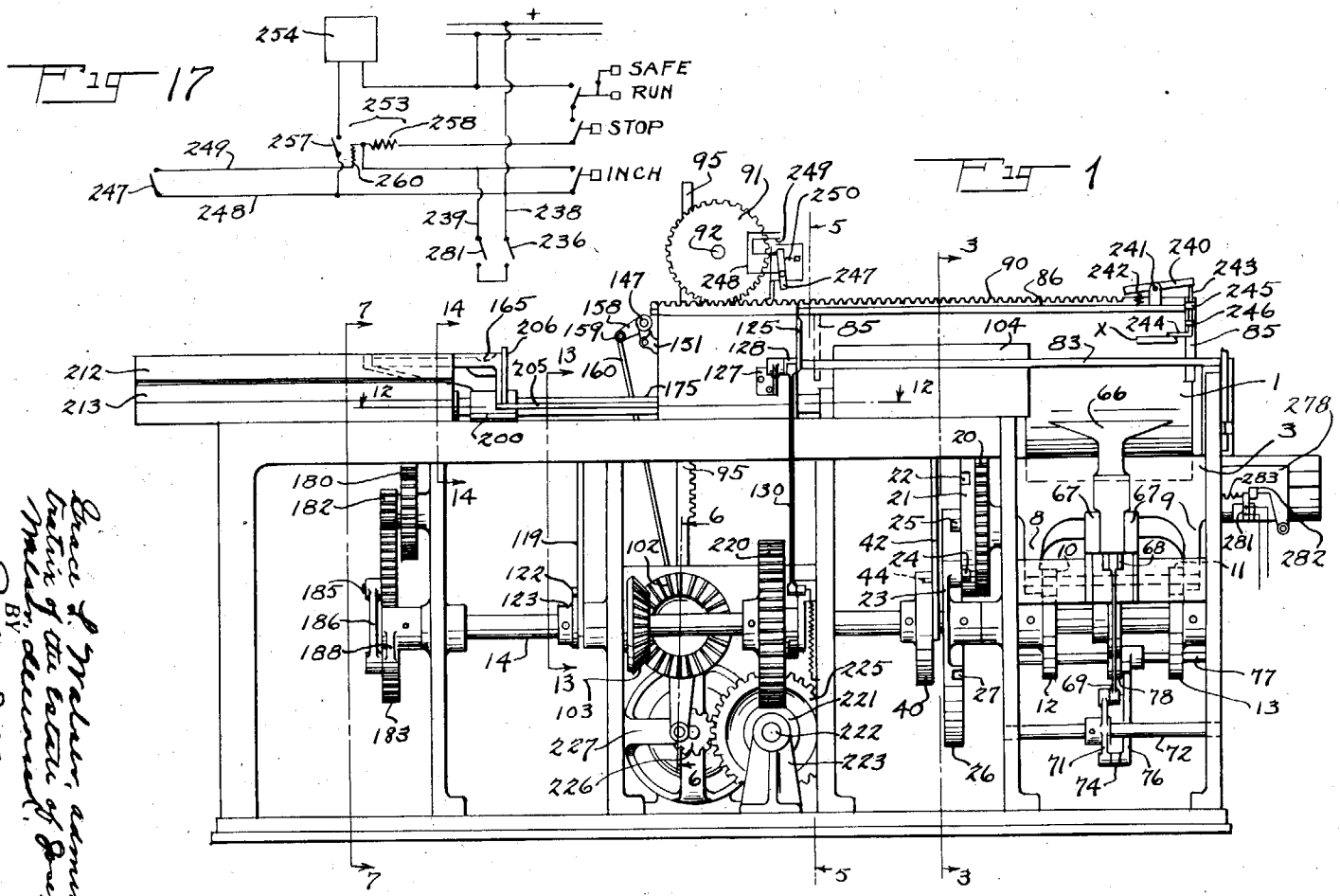
Fig. 1 is a side elevation of a machine embodying the invention.
Fig. 17 is a diagrammatic view of the electrical connections and controls for the machine.

This application is a division of the inventor's copending application Ser. No. 407,984, filed September 3, 1920.

In the present exemplary embodiment the machine comprises certain mechanisms and instrumentalities which will be briefly described as a matter of convenience and clearness preliminarily to a particular and detailed description of the entire illustrative machine, although it will be understood that the invention is not necessarily limited to the various features and devices as so described, nor to their complete and collective cooperation one with the other.

As so embodied, the machine comprises a horizontally disposed rotatable casting core and therebeneath a cooperating concave casting member, these together constituting a casting chamber. The concave member has up and down movement to and from the core for casting the plate, and for subsequent clearance in removing the plate, inserting and removing the matrix, etc. The core after casting makes a half rotation to bring the plate to delivery position. The plate is thus brought above the core, and is then lifted vertically clear of the core preparatory to its removal or conveyance automatically by the machine to the finishing mechanism. Devices are provided which operate automatically to hold the core with the plate above it while the plate is being lifted and then removed to the finishing mechanism.

The hot metal is poured into the casting chamber at one of the straight edges of the plate, and the mechanism is preferably designed to form a riser, or a portion of extra or waste metal, beyond each of the straight edges of the plate proper. The hot metal pump moves to and from pouring position through the automatic operation of the machine and the pump is preferably hand operated.

The completion of the metal pouring operation automatically starts into operation the movements of the casting mechanism, already described, and sequentially thereafter the subsequent movements or operations of the finishing mechanism.

The cast plate after being lifted or freed from the core is conveyed to a finishing station, and there, while the plate is at rest, the two straight edges are trimmed, the risers or waste metal being cut off, and the interior arcuate ribs are trimmed or shaved. These operations on the plate are effected by a travelling carriage which moves past the stationary plate. This carriage has a pair of cutters which trim the straight edges and cut off the waste metal therefrom, and has also an arcuate cutter which passes within the curved plate and trims or shaves the arcuate ribs which have been cast on the inner side of the plate. The holding devices which hold the plate at the trimming station are formed to hold the plate so as not to interfere with the operation of the various trimming devices as described.

The travelling carriage for the trimming devices, as described, also serves to take the trimmed plate with it on its backward or return trip and to deliver it at a delivery and cooling station from which the plate may be taken and put upon the press cylinder.

In the embodied form, more in detail, the machine is provided with a power shaft, or shafts, upon which are various cams or other suitable actuating devices and connections therefrom, which operate the core rotating, plate lifting, plate conveying and trimming mechanism, together with the other devices referred to, the rotation or operation of the shaft being controlled by the completion of the pouring of the hot metal into the casting chamber. The pouring operation in this present embodiment is preferably manually operated or controlled, and as shown, the hot metal pump has a handle worked by an attendant, and after or upon the completion of the pump stroke, the power shaft turns over automatically and the various operations on the plate follow sequentially in the machine until the plate is finished and ready for delivery.

Referring now in detail to the embodiment illustrated by way of example in the accompanying drawings, the plate casting mechanism comprises a horizontally disposed casting core 1 provided with a shaft 2, suitably journaled in the machine frame, the core or cylinder 1 being rotatable. As embodied, the stereotype plate is cast against the under side of the core, the core thereafter being given a half rotation, whereby the plate is brought to the top of the core preparatory to conveyance or delivery therefrom to the subsequently operating mechanisms of the machine.

Cooperating with the core 1 is a concave casting member 3, slidable vertically toward the core 1, on the under side thereof, to form the casting chamber into which the hot metal is poured to cast the plate, and slidable away therefrom to afford clearance for the rotation of the core and the delivery of the cast plate. A slidable mounting for the concave member 3 comprises arms 4 and 5, working, respectively, in guideways 6 and 7 in the machine frame, there being a pair of these guideways at either end of the concave member 3. Suitable matrix clamps and edge stops are provided, which may be of any suitable or adequate form, and have been omitted from the drawing for the sake of clearness.

The mechanism for vertically reciprocating the concave member 3 to and fro, comprises a pair of arms 8 and 9, likewise formed on the back of the member 3 and extending downwardly therefrom, said arms having mounted in their lower ends friction rollers 10 and 11, which rollers bear, respectively, on cams 12 and 13, which are fixed on a shaft 14. In this embodiment the shaft 14 may be styled the main or power shaft of the machine, as it extends throughout the length of the machine and actuates most of the mechanisms which operate upon the plate. The rotation of the shaft 14, through the cams 12 and 13 moves the concave member 3 to casting position, holds it there while the plate is being cast, and thereafter retracts concave member 3, preparatory to the delivery of the plate.

Figure 3:
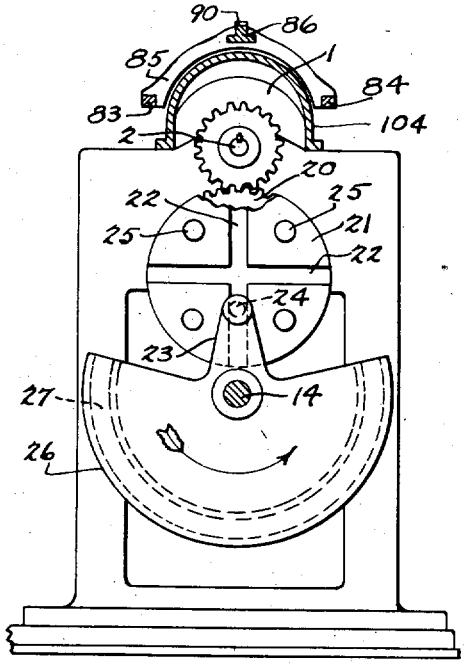
Fig. 3 is a vertical transverse section through the machine on line 3—3 of Fig. 1, looking in the direction of the arrows, showing the mechanism during the rotation of the casting core.
Figure 4:
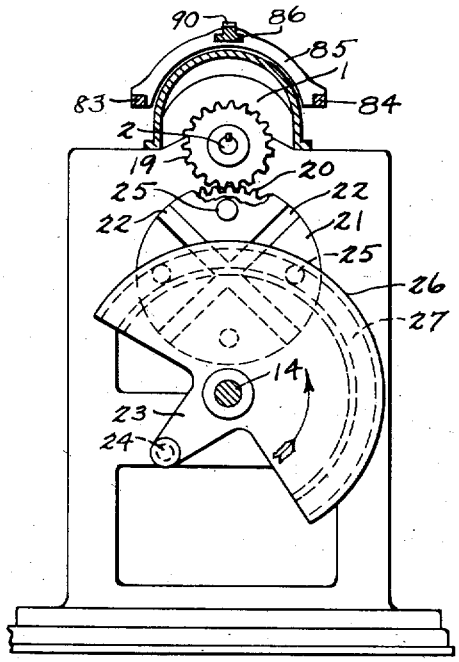
Fig. 4 is the same view as Fig. 3, but showing the mechanism holding the core stationary with the plate on top.

Referring now to the embodied form of means for effecting and controlling the rotary movements of the casting core 1, that is for holding it at the casting position to make the cast, rotating it a half turn between the casting and plate delivery position, and holding it at the latter position while the plate is being delivered, said means comprises a gear wheel 19 fixed on the shaft 2 of the core 1, and meshing therewith a gear wheel 20, which is supported on a short shaft journaled in the machine frame (see Figs. 1 and 4). Fixed to one face of the gear wheel 20, to rotate therewith, is a cam wheel 21 (Figs. 1, 3 and 4).

Cam wheel 21 has formed in its exterior flat face a series of straight, intersecting, radially disposed cam ways 22, preferably four in number. Fixed on shaft 14 is an arm 23 provided with a cam roller 24, which roller during the rotation of shaft 14 is adapted to enter one of the cam ways 22, and thereby to impart a quarter rotation to the cam wheel 20 for each revolution of shaft 14. The cam roller 24 then leaves the particular cam way 22, and on its next revolution the roller 24 enters the next cam way 22 to repeat the motion just described. Gear wheel 20 receives a quarter rotation with the cam wheel 21, thereby imparting, by reason of the ratio between gear wheels 19 and 20, a half rotation to the gear wheel 19 and therewith to the casting core 1. The cam roller 24 enters the lower right hand cam way 22, when in the position shown in Fig. 4, and leaves it when such cam way is in the position of the next adjacent cam way 22 to the left, as shown in Fig. 4. Figure 3 shows the parts midway of this movement. The core is thus given a half rotation between the casting and delivery positions between successive casts and deliveries, successive plates being cast on opposite sides of the core.

Means are provided for holding the core stationary for the period of the delivery and casting of the next plate, and as embodied a plurality of rollers 25 are rotatably mounted on the exterior face of the cam wheel 21. Fixed on shaft 14 in definite relation to the arm 23, and preferably fixed thereto or integral therewith, is an arcuate plate 26 provided with a guideway 27 for the rollers 25, the guideway being concentric with the shaft 14 (Figs. 1, 3 and 4). As the shaft 14 rotates to effect the movement of the core 1 already described, as cam roller 24 leaves the cam way 22, one of the rollers 25 enters the forward end of guideway 27, and thereafter the diametrally opposite roller 25 also enters the guideway 27 (see Fig. 4) and the entire mechanism just described, including the casting core 1, is held in fixed position while the rollers 25 pass through the guideway 27. The last roller 25 leaves the guideway 27, when a new plate is cast, preparatory to roller 24 engaging another cam way 22, preparatory to rotating the newly cast plate to the delivery position.

Figure 8:
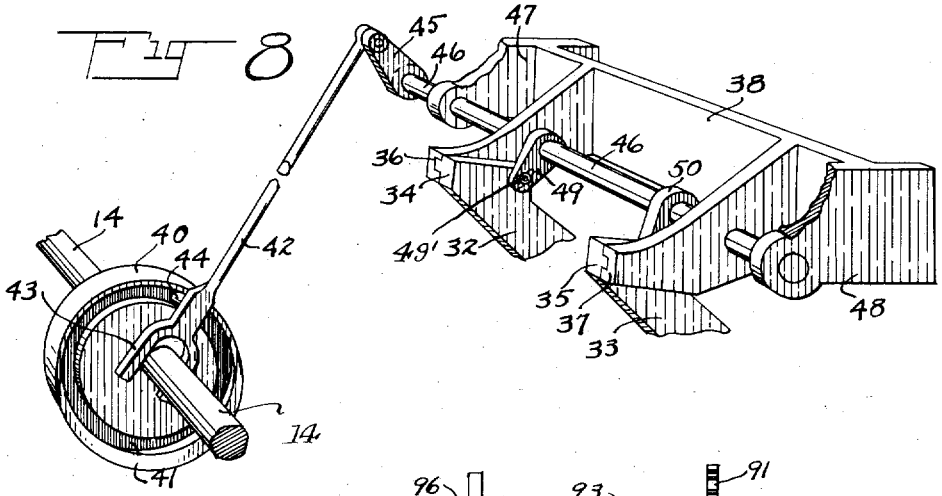
Fig. 8 is a perspective, fragmentary view of a part of the mechanism for moving the hot metal supplying mechanism to and from pumping position.

The embodied form of mechanism for supplying the hot metal to the casting chamber comprises a pump and delivery spout therefor, which move to and from casting position. As embodied, a hot metal reservoir 30 is provided, within which a pump 31 is suspended by upwardly extending arms 32 and 33 (see Figs. 2, 7 and 8). Arms 32 and 33 are provided with laterally extending guides 34 and 35, which work in corresponding guideways formed in arms 36 and 37, which arms are fixed to and project from a part 38 of the machine frame. As the arms 32 and 33 reciprocate in their guideways, the pump 30 and its delivery spout 39 move to and fro, the mouth of the spout coming to casting position at the proper time, remaining to deliver the hot metal into the casting chamber, and thereafter receding to give clearance for the operation of the casting mechanism, including the rotation of the core 1 between casting and delivery positions.

The embodied form of means for imparting these movements to the pump and its spout (see Figs. 1, 7 and 8) comprises a cam 40, fixed on shaft 14, and having therein a cam groove 41. A rod 42 has a yoke 43 straddling the shaft 14, and mounted on rod 42 is a cam roller 44 working in the cam groove 41. At its opposite end rod 42 is pivotally connected to an arm 45, fixed on a shaft 46, which shaft is journaled in brackets 47 and 48, formed on the machine frame, and also in the supporting guide arms 36 and 37. Fixed on shaft 46 is a pair of arms 49 and 50, which are pivoted, respectively, to the pump supporting arms 32 and 33 by means of a pin and slot connection 49'. Thus as cam 40 rotates, rod 42 is reciprocated, shaft 46 is rocked, thereby moving or sliding arms 32 and 33 in their respective guideways, and imparting to pump 31 and its spout the movements already described.

The pump in the present embodiment and in accordance with certain features of the invention is operated by the attendant, and as embodied a pump handle 52 is pivoted at 53 upon the machine frame. Pivoted to the opposite end of the handle or lever 52 is a rod 54, pivoted at 55 to a rod 56, which latter rod carries the pump plunger. This connection allows for the to and fro movement of the pump already described. In accordance with one feature of the invention the machine is called into action by the operator or attendant, and as embodied this is effected through the actuation of the pump handle, as will be later described.

Referring now to the embodied form of means for removing or lifting the plate from the casting core 1 (see Figs. 1 and 2), a stop 65 is provided on the machine frame, against which the forward straight edge of the cast plate engages as it rotates with the core 1 in coming from the plate casting to the plate delivering position. On the opposite side of the core 1 is provided a plate lifter 66, adapted to engage with the other straight edge of the cast plate, and having vertical movement to lift the plate away from the core 1, preparatory to its conveyance to the plate finishing station.

The lifter 66 is mounted in guideways 67 in the machine frame to have vertical reciprocation. In the embodied form of actuating means for the plate lifter, there is pivoted at 68 to the plate lifter 66 a rod 69, which rod at its other end 70 is pivoted to a lever 71, which lever is journaled on a shaft 72 mounted in the machine frame. Pivoted to the lever 71 at its other end 73 is a rod 74, which rod is pivoted at 75 to a bent lever 76, which lever is journaled on a shaft 77 mounted in the machine frame. At its other end lever 76 is provided with a cam roller 78, this cam roller cooperating with a cam 79 fixed on the shaft 14. When the forward straight edge of the cast plate engages with the fixed stop 65, lifter 66 is behind or comes behand the other straight edge of the cast plate, and it is then moved upwardly by the mechanism just described and the plate is lifted from core 1 to position to be conveyed to the trimming station.

Figure 11:
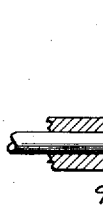
Fig. 11 is a fragmentary, detail horizontal section on line 11—11 of Fig. 5.
Figure 5:
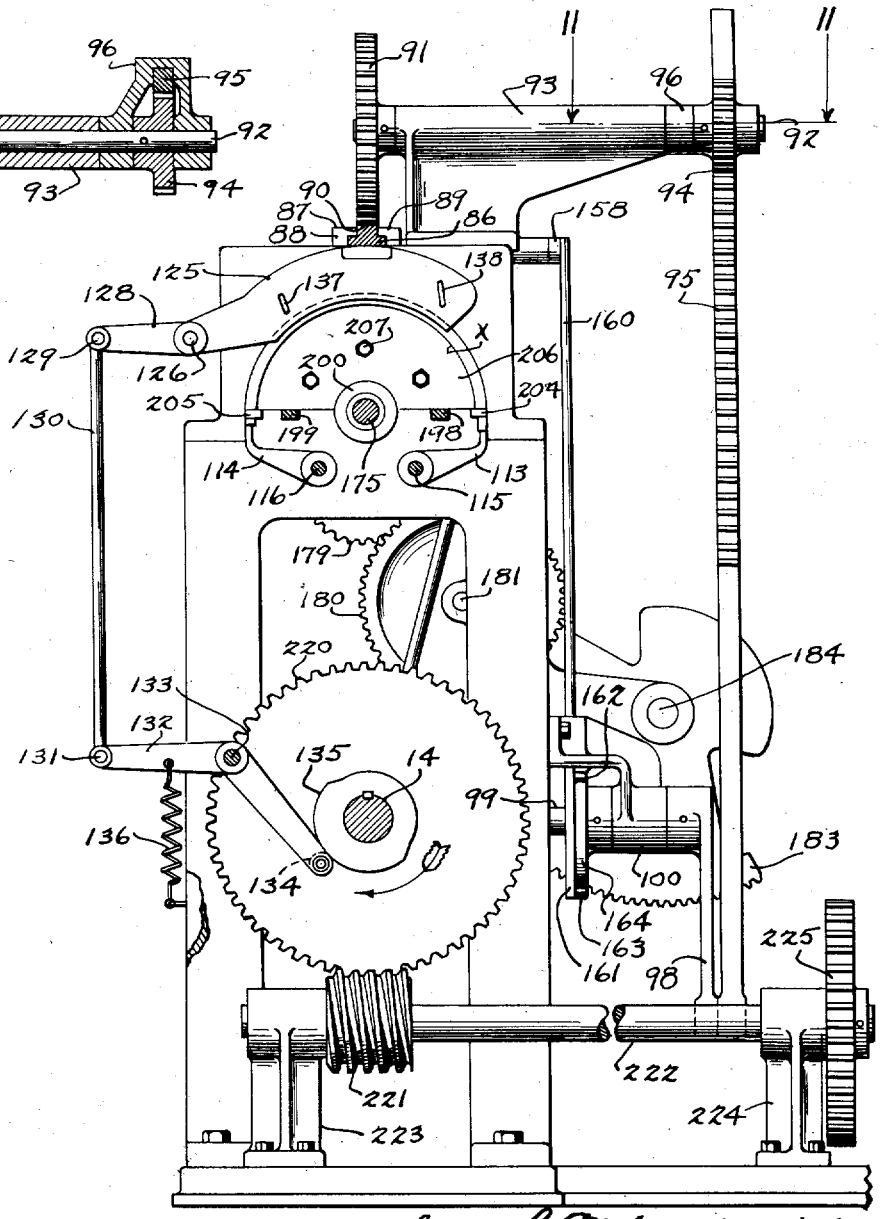
Fig. 5 is a transverse section through the machine, on an enlarged scale, on line 5—5 of Fig. 1, looking in the direction of the arrows, showing the plate clamped in position at the trimming station.

Referring now to the embodied form of means for conveying the plate between the position just described and the trimming station or mechanism, a pusher 85 is fixed upon one end of a long horizontally disposed bar 86 (Figs. 1, 2, 3, 4 and 5). The opposite ends of the pusher 85 engage with and run along horizontally disposed guides 83 and 84, mounted on the machine frame. The bar 86 is mounted in a guideway 87 located at the top of frame of the trimming station (Figs. 1 and 5). Guideway 87 consists of two parallel side members 88 and 89 adapted to fit the shape of the reciprocating bar 86, which is that of an inverted T. The upper part of the bar 86 projects through the guideway between the members 88 and 89, and is provided with a toothed rack or straight gear 90. Meshing with the straight gear 90 is a gear wheel 91, fixed on a shaft 92, which shaft is journaled in a bearing 93, fixed on the machine frame. Fixed also on shaft 92 is a gear pinion 94, with which meshes a toothed rack or straight gear formed on a reciprocating bar 95 (Figs. 1, 5 and 11). Bar 95 is held to pinion 94 by a guideway formed in a bracket 96 supported on shaft 92.

The embodied form of means for reciprocating rack bar 95 comprises a crank arm 98 to which the lower end of rack bar 95 is pivotally connected, the rack bar thus reciprocating as the crank rotates. Crank arm 98 is fixed to a shaft 99 (Figs. 1, 5, 6 and 7), which shaft is journaled in bearings 100 and 101, supported on the machine frame. Fixed to shaft 99 is a beveled gear wheel 102, which meshes with a beveled gear wheel 103, fixed on shaft 14. Thus, as crank arm 98 is rotated, rack bar 95 reciprocates to and fro, and through pinion 94 and gear wheel 91, reciprocates rod 86. Pusher 85 is thereby traveled to the right in Fig. 1, and thereafter the lifting mechanism lifts the plate $x$ in front of it. On the reverse movement of the mechanism, the cast plate is moved to the left by the pusher 85 toward and into the plate trimming mechanism, the end of the travel of the pusher positioning the plate for trimming within the trimming mechanism. A support 104 is provided for carrying the plate during this travel.

At the trimming station the straight edges of the plate are trimmed. The plate is preferably cast with a riser, or a piece of waste metal, along each of the straight edges, thereby insuring sound metal throughout the extent of the plate itself. In the present embodiment, therefore, both of the straight edges of the plate are broached or trimmed, and the interior concave ribs on the plate are shaved at a single operation.

Suitable devices are provided for firmly holding the plate during the trimming operation, and as embodied, clamps 113 and 114 are provided (Figs. 5, 12 and 13), which are arranged in pairs at either end of and beneath the straight edges of the plate as it rests in the trimming position, and are then swung upwardly to clamp the plate firmly in position against the arch of the trimming mechanism, as shown in Fig. 5. While the plate is thus held, the straight edges are cut, and the clamps 113 and 114 then swing downwardly to discharge the severed risers, the plate at the same time dropping to rest on the mechanism which removes it from the trimming to the delivery station.

Clamping arms 113 are fixed to a shaft 115 journaled on the frame, and clamping arms 114 are fixed to a shaft 116, journaled on the machine frame. Shafts 115 and 1116 are connected together by a geared sector 117 on shaft 115 meshing with a geared sector 118 on shaft 116. A connecting rod 119 is pivotally connected at its upper end to an arm 120 fixed to shaft 115. At its opposite end, rod 119 has a yoke 121 which straddles shaft 14. A cam roller 122 is carried on rod 119, and cooperates with a cam 123, fixed on shaft 14 to rotate therewith. A spring 124 is in tension between the arm 120 and the machine frame to hold the cam roller 122 to cam 123. The manner of operation of this mechanism has already been described.

Means are provided for preventing backward movement of the plate in the trimming mechanism, the embodied form thereof being adapted to cooperate with a semi-circular shaving or planing knife which travels longitudinally and interiorly of the cast plate to shave or finish the arcuate ribs on the interior of the plate. As embodied, an arcuate stop 125 is adapted to swing down in the rear of the plate $x$, while not projecting below the inside surface of the plate (Figs. 1 and 5). The stop 125 is pivotally mounted at 126 on a bracket 127, which is supported on the machine frame. Fixed to the stop 125 is a lever 128, and pivotally connected to the lever at 129 is a rod 130. At its other end 131, this rod is pivotally connected to a lever 132, which lever is mounted on a shaft 133, supported on the machine frame. At its opposite end shaft 133, has a cam roll 134, which cooperates with a cam 135 fixed on the shaft 14. A spring 136 in tension between lever 122 and a support on the machine frame serves to hold lever 132 to its cam 135. The stop 125 is in raised position as the plate advances and then moves downwardly behind the plate, holding it at the rear while the trimming or finishing devices effects the shaving action along the interior of the plate from the opposite end.

A suitable plate holding device is provided for supporting the plate especially after the finishing device has passed into the interior of the plate, and after the risers have been cut off the straight edges of the plate, and prior to the removal of the plate, carried by the finishing device, as will be hereinafter more fully described. (See Figs. 1, 7, 9 and 10.) This mechanism also serves to hold the plate firmly in position relatively to the trimming devices so that there will be no movement of the plate during the finishing and so that the cutting of the straight edges and the shaving of the rim will be true throughout the plate.

In the embodied form of said mechanism, an arm 146 is fixed on a shaft 147, journaled in brackets 148 and 149, which are supported on the frame of the trimming station. Pivotally mounted at 150 on arm 146 is a hook 151, this hook having a plate engaging surface 152, which engages the plate $x$ interiorly thereof and at the crown of its arc and presses it firmly against the frame of the trimming station. On the opposite side of its pivot point 150, the hook 151 has a tail 153, which is acted on by a suitable spring 154. A limiting pin 155 is also mounted in the arm 146. Fixed to shaft 147 is an arm 158, and pivotally connected to the end of arm 158 at 159 is a rod 160. Rod 160 at its lower end (Figs. 5 and 6) is of yoked or annular form, as shown at 161, and is provided with cam rollers 162 and 163 which cooperate with a cam 164, fixed on shaft 99.

As previously stated, and as will hereinafter be more fully described, the finishing mechanism enters the plate from the left hand end in Fig. 1, passes within and longitudinally of the plate $x$ to effect the finishing, and thereafter travels in the opposite or return direction taking the finished plate with it to the delivery station. As embodied (Figs. 1, 9 and 10) there is formed in the top and forward portion of the finishing mechanism a curved cam surface 165. The cam 164 is so timed that during the advancing movement of the trimming mechanism, the plate supporting hook 151, which at this time is yieldingly pushed against stop pin 155 by spring 154, drops into the cam recess 165. As the trimming device advances, the hook 151 rides up the left hand side (in Fig. 10) of the curved cam surface 165 onto the straight cam or bearing surface 166, the spring 154 yielding to permit this movement.

In this position the hook 151 is in fixed relation relatively to the cutter on the finishing mechanism, and as it directly engages the plate $x$, the plate is held firmly and in true position during the entire finishing operation, thereby effecting a uniform and true finish on the plate. This also prevents this end of the plate from dropping downwardly when the risers are cut off from the straight edge. After the finishing device has completed its stroke, cam 164 swings arms 158 and 146 to the left in Fig. 10, and brings them to the position of Fig. 9 and clear of the plate.

Referring now in detail to the plate finishing devices, such devices in the present embodiment reciprocate to and fro in a straight line, on the forward stroke cutting off the risers from both the straight edges of the plate and at the same time shaving the arcuate ribs on the interior of the plate by means of a semi-circular cutter. The finished plate is then dropped onto the back or top of the finishing device, which on its return reciprocatory movement conveys the plate to the delivery and cooling position.

Figure 7:
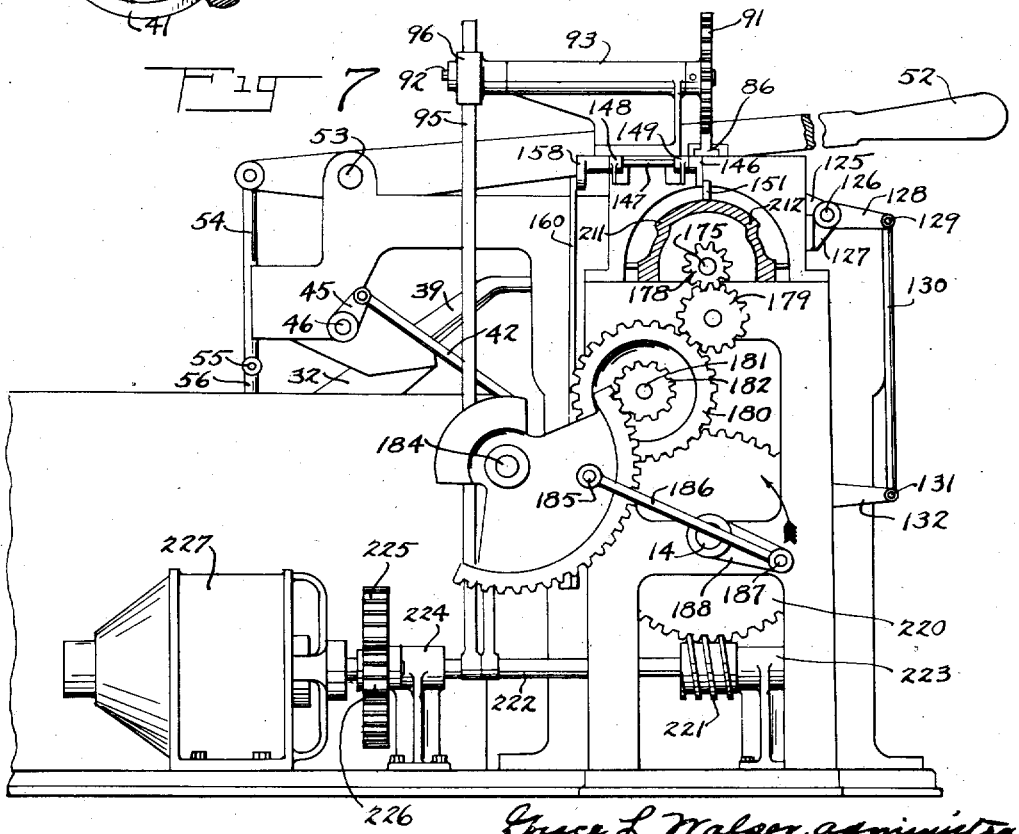
Fig. 7 is an end elevation, looking at Fig. 1 from the left.
Figure 12:
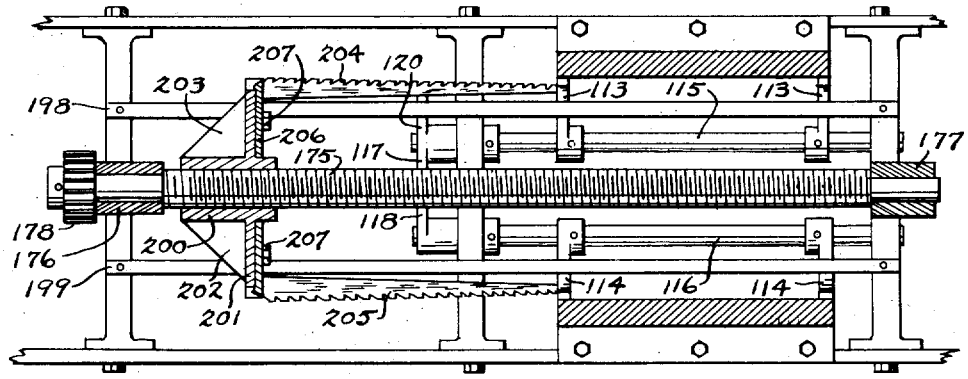
Fig. 12 is a horizontal fragmentary section on line 12—12 of Fig. 1; showing the plate trimming devices.

As embodied, a screw shaft 175 is rotatably journaled in bearings 176 and 177 in the machine frame so as to have rotation without longitudinal movement (Figs. 1, 7 and 12). Screw shaft 175 is rotated first in one direction and then in the other to give reciprocatory longitudinal travel to the finishing device, which is threaded on the shaft. For this purpose there is fixed on the exterior end of screw shaft 175 a pinion 178. Pinion 178 meshes with an intermediate gear wheel 179. Gear wheel 179 meshes with the gear wheel 180 fixed on a shaft 181. Fixed also on shaft 181 is a gear wheel 182, with which meshes a gear sector 183, journaled on shaft 184, which shaft is journaled in the machine frame. Pivotally connected to geared sector 183 at 185 is a connecting rod 186, which at its opposite end 187 is pivoted to crank arm 188 which crank arm is fixed on shaft 14. Thus as shaft 14 rotates and crank arm 188 therewith, geared sector 183 is oscillated first in one direction then in the other, and by the multiplying gears just described, screw shaft 176 is rotated first in one direction and then in the other to impart to the finishing mechanism the necessary longitudinal reciprocatory movement.

In the embodiment form the finishing device comprising a hub 200, screw threaded on shaft 175, a vertically disposed supporting plate 201 being fixed to or integral with hub 200. The plate 201 is also connected to the hub 200 by stiffening webs 202 and 203. Longitudinally disposed guides 198 and 199 are provided, along which the finishing device reciprocates in its travel. Supported on the front of plate 201 are two forwardly projecting broaching cutters 204 and 205, located and shaped to cut off the two straight edges of the plate which is held in position at the finishing station by the clamping arms 113 and 114. The internal arcuate ribs on the cast plate are shaved by a semicircular cutter 206, carried in fixed position upon the front of the plate 201, and fixed thereto by suitable means, such as bolts 207 passing through holes 208 in the cutter. The edge 209 of the cutter is of approximately semicircular form, and it passes across the ribs on the inside of the plate during the longitudinal travel of the finishing device, thereby shaving the backs of the ribs to true form.

Figure 10:
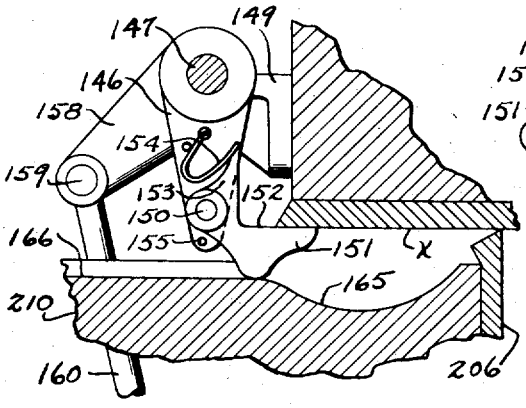
Figs. 9 and 10 are enlarged, fragmentary detail views, showing the operation of the left hand device shown near the center of Fig. 1 for holding the plate at the finishing station.
Figure 9:
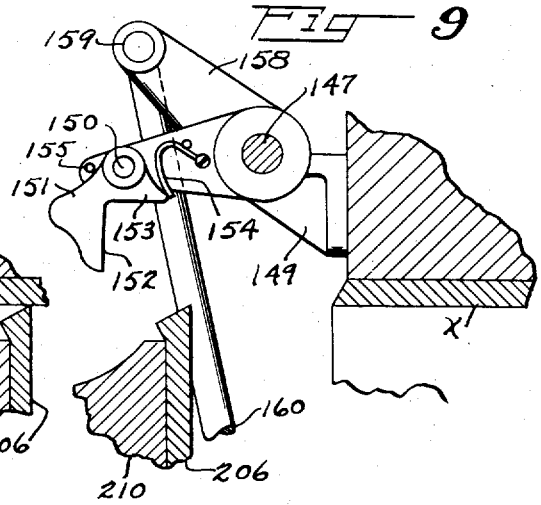
Figure 13:
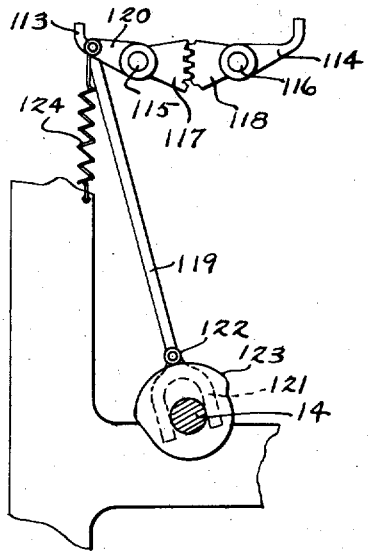
Fig. 13 is a detached detail on line 13—13 of Fig. 1, of the clamps engaging the straight edge of the plate at the finishing station.

As previously stated, the finishing device serves also to convey the finished plate from the finishing station to the delivery and cooling station, and the plate carrying part or means of the finishing device comprises a curved saddle 210 projecting rearwardly from the plate 201 (Figs. 1, 10 and 14) and being of arcuate outer form so as to fit beneath the upper or crown portion of the plate edge. A supporting web 211 also extends backwardly from the hub 200 as a stiffener and support beneath the saddle 210. The cam grooves 165 and 166 referred to in connection with the description of the plate supporting hook 151 are formed in this saddle 210 (Figs. 10 and 13).

After the broaches 204 and 205 have cut through the straight edges of the plate and the circular cutter 206 has shaved the backs of the ribs, the finishing device comes to rest with the cutter 206 just to the right of plate in Figs. 1 and 12. The saddle 210 is just beneath the plate and of substantially the same length. Clamping levers 113 and 114 swing downwardly, releasing the plate, and dropping the cut off risers out of the machine, hook 151 swings clear of the plate to the position of Fig. 9, and the plate drops very slightly on to the saddle 210. Gear sector 183 changes its direction of rotation as does also screw shaft 175, and the finishing device travels on its return movement, to the left in Fig. 1, to the position shown in that figure, carrying with it the finished plate.

Figure 14:
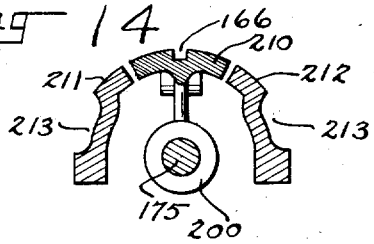
Fig. 14 is a vertical section on an enlarged scale, taken on line 14—14 of Fig. 1 showing the relation of the plate carrier to the delivery table.
Figure 15:
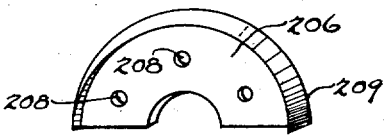
Fig. 15 is a perspective detail of the cutter for shaving or finishing the concave ribs on the inside of the stereotype plate.

As stated, the plate $x$ now completely finished, is brought to the delivery position and left thereupon a support to be removed by an attendant. The plate support comprises two curved members 211 and 212 (Figs. 1, 7 and 14). The plate supporting members 211 and 212 are recessed at their top forward end to receive the saddle 210, which slides in between them as best shown in Fig. 14. Air circulating recesses 213 may also be provided if desired. By the return movement of the saddle 210, the plate is slid upon the supports 211 and 212, and remains there on the next forward movement of the saddle.

In the embodied form the machine is driven from a single motor, and as already described, the various mechanisms are actuated from shaft 14 or from the shafts driven therefrom, although any suitable form of drive might be employed so far as concerns most features of the invention. The embodied form of drive for shaft 14 comprises a worm wheel 220, fixed on shaft 14. Worm wheel 220 meshes with a worm 221, which worm is fixed on a shaft 222, journaled in bearings 223 and 224 on the machine frame. Fixed also on shaft 222 is a gear wheel 225, with which meshes a pinion 226, fixed on the shaft of motor 227.

Figure 2:
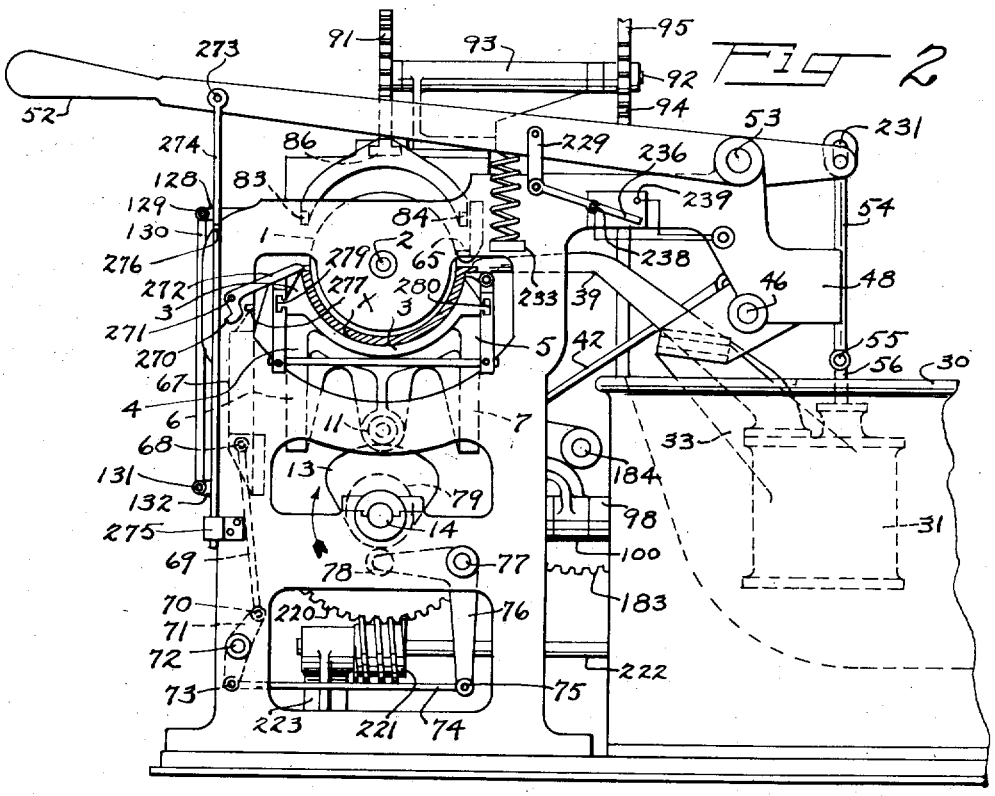
Fig. 2 is an end elevation, looking at Fig. 1 from the right, and showing the mechanism in casting position.
Figure 6:
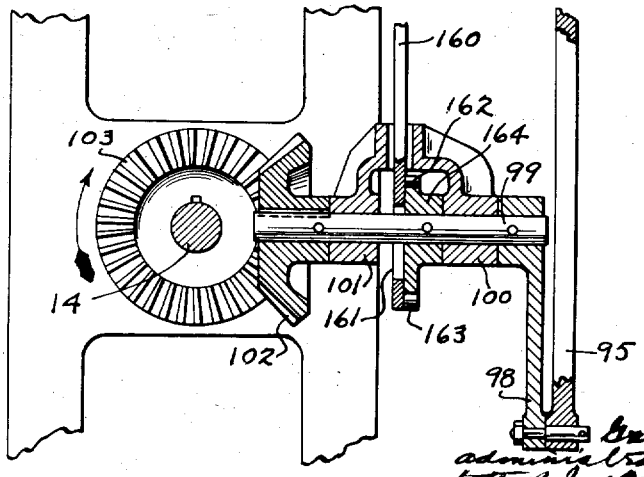
Fig. 6 is a fragmentary transverse section, on an enlarged scale, taken on line 6—6 of Fig. 1, looking in the direction of the arrows.

In the embodied form, as stated, the machine is called into action by the operator actuating the pump handle 52 in making the cast. The embodied form of means for accomplishing this comprises or cooperates with devices for bringing the matrix holder to casting position preparatory to pumping the hot metal. In such embodiment, a switch lever 236 is pivotally mounted on the frame to constitute a circuit terminal 238, and is moved by the pump handle 52 to momentarily close the circuit as terminal 239 (Fig. 2). Switch lever 236 at its opposite end is pivotally connected to a link 229, which link is also pivotally connected to the pump handle 52. The handle 52 is connected to the pump rod 54 by a pin and slot connection 231, which permits the handle 52 to operate switch 236 sufficiently in advance of the pumping operation to start the machine and to bring the matrix carrier 3 from its depressed or open position to the closed or casting position shown in Fig. 2 prior to the pouring of the metal into the casting chamber. A spring 232 in compression between the pump handle 52 and a support 233 on the machine frame keeps the pin on pump lever 52 normally in the bottom of slot 231.

In the operation of the device, when the machine is ready for casting but while it is at rest, pump handle 52 is depressed, and thus swings switch lever 236, making the circuit between terminals 238 and 239. This energizes relay coil 258, the further connections for which will be later described, thereby starting the machine. When the machine starts, the concave 3 is brought to casting position, and thereafter, the pump handle continuing its downward stroke, and the pin reaching the upper end of slot 231, the pump is actuated, to pour the hot metal into the casting chamber. Means are preferably provided for guarding against the pump being actuated if there is no matrix in casting position and to prevent the pumping action before the concave 3 is at casting position, which will be described later.

The machine is brought to rest, in the embodied form, by the conveyor 85 returning to the trimming station without a plate. The means for effecting this comprises a switch operating lever 240, pivoted to 241 on the conveyor 85, and the switch engaging end of lever 240 is impelled into operative position by a spring 242. Beneath the other end of the lever 240 is a longitudinally slidable pin 243, shaped at its bottom 244 to engage with the cast plate $x$, as the plate is lifted to delivery position from the casting core 1. Pin 243 is supported by, and is slidable in, bearings 245 and 246 on the conveyor 85.

The switch with which the foregoing mechanism cooperates comprises a lever 247 making and breaking the circuit between terminals 248 and 249, the circuit connections of which terminals will be later described. The switch is impelled to circuit-closing position by a spring 250.

If a plate is fed to the conveyor 85 at the casting position, lever 240 will be moved to inoperative position, as shown in Fig. 1, by the sliding pin 243, and switch 247 will remain closed when conveyor 85 brings plate *x* into the trimming station to be trimmed. If, on the other hand, no plate is taken by conveyor 85 at the casting station, spring 242 will rock lever 240 into the opposite position from that shown in Fig. 1, and the lever will open switch 247 when conveyor 85 reaches the finishing station. The electrical connections and mechanism in Figs. 1 and 2 are shown in somewhat diagrammatic form for the sake of clearness.

The electrical circuits, connections and controls for the machine may be of any suitable or standard form, so far as concerns many features of the invention. In Fig. 17 is diagrammatically shown one form of electrical controlling and operating mechanism, the relation of the terminals 238, 239 and 248 and 249 and of switches 236 and 247 being shown therein. Said mechanism comprises a relay device 253 and a self starter 254, the power lines being indicated conventionally. When relay 253 is closed, it connects the current through the self starter 254, which in turn, by controlling the motor circuit in the usual manner, starts the motor 227, thereby starting the machine. When relay device 253 is opened, the motor 227 is stopped, thereby stopping the machine, the current supply to the self starter being controlled by switch 257 of the relay.

In operation, when switch 236 is closed by the pump handle 52, relay switch 257 is closed by the current through coil 258 of the relay device 253, and motor is started by the self starter. The switch 236 is closed but momentarily, but when is opens, switch 257 of the relay does not open, but is held closed through the resistance or holding coil 260 of the relay, provided switch 247 is closed (which is the case except when conveyor 85 reaches the trimming station without a plate). Coil 260 will not let through enough current to close relay switch 257, but when the switch is already closed, the coil will hold it in closed position. When the casting has stopped, conveyor 85 will reach the trimming station without a plate, switch 247 will be thereby opened, and coil 260 will release switch 257, and the self starter 254 will cut off the current in the motor circuit and the motor will be stopped thereby stopping the machine.

Thus, whenever the pump handle 52 is actuated, the motor 227 will start, starting the machine, and it will run so long as a plate is cast every time the machine comes into position for it. When the desired or required number of plates has been cast and the castings discontinued, the machine will still make another revolution to finish and deliver the last plate cast. It will then stop by reason of the lever 240 opening switch 247 on the first idle reciprocation of the conveyor 85, as already described.

As the machine is shown in Fig. 1 the parts are not exactly timed, but are shown in what is believed to be the clearest positions for reading the drawings. As embodied, the operating of delivering a particular plate from the casting box and conveying it into the trimming station is effected on one revolution of the machine, and concurrently or in timed relation therewith, the last previously cast plate is trimmed and is then conveyed to the delivery or storage position. The particular plate first referred to is trimmed and stored on the next revolution of the machine, but the equivalent of a complete plate is produced on each revolution of the machine.

The machine is so timed that it will stop so that the casting chamber will be in open position to permit change of matrices, and so that the last plate sent through will be finished and delivered or stored. Thus when the carriage 200, which is equipped with the trimming devices and the plate delivering saddle 210, is in the position of Fig. 1, the plate conveyor 85 is at the left hand end of its travel in Fig. 1 (shown in dotted line) and the casting chamber is open.

In Fig. 17, hand-operated switches are shown for manual control of the machine. When the "Run" button is pushed to the "in" position the machine will operate as described. When the "Safe" button is in, the machine will not run at all until the "Run" button is again pressed. When the "Stop" button is pressed, the machine will stop at once without going to the end of its cycle. By means of the "Inch" button, the machine can be turned over slowly, by degrees, or "inched" along for any purpose. The connections and operation of the foregoing will be clear from an inspection of Fig. 17 without further detailed description.

The embodied form of safety device for preventing the untimely pumping of the hot metal already referred to, comprises a hook 270, pivoted on the machine frame at 271, the tail 272 of the hook being in position to be tripped by the concave or matrix carrier 3 coming to casting position, and is normally supported in this position by a lug 277 on the machine frame. Pivotally supported at 273 on the pump handle 52 is a rod 274, extending downwardly and reciprocable in a guide 275 on the machine frame. Rod 274 has a lug 276 formed thereon. When the concave 3 is away from casting position, hook 270 is in position to engage with lug 276 and thus to prevent pump handle 52 being depressed. When, however, concave 3 comes to casting position, it tilts hook 270 as shown in Fig. 2, and hook 270 is rocked back so that lug 276 on rod 273 is free to pass and the pump handle may be actuated. The pivot point of lever 270 is positioned so that the thrust of lug 276 is radial when hook 270 is in engaging position, so that the lug 276 will not rock the hook out of engaging position.

Means are preferably provided in cooperation with the foregoing to prevent the starting of the machine when there is no matrix in the concave 3. As embodied, the matrix holder 278 is slid in guideways 279 and 280 in the concave 3, and when the matrix is in casting position with respect to its carrier 3, the holder 278 closes a switch 281, which is in series with switch 236 and is automatically opened by a spring 283 whenever the matrix holder is withdrawn from, or is not in proper position within, the matrix carrier 3. The matrix holder 278 is provided with a projection 282 which closes or bridges the terminals of switch 281 when the matrix holder 278 is in proper casting position.

It will be seen that the pump handle cannot be actuated further than to close switch 236 until the concave 3 is in casting position, and to bring the concave to casting position, requires that the machine be started. The machine cannot be started until switch 281 is closed and this switch is closed only when a matrix is in proper place within the carrier or concave 3. When the matrix is so placed and switch 281 is consequently closed, the closing of switch 236 by the pump handle 52 starts the machine. This brings the concave 3 to casting position, thereby rocking hook 270 out of the path of lug 276, and the hot metal can be pumped into the casting chamber.

In Figs. 16, 18 and 19, are shown details of the plate lifter which is shown in a general way in Fig. 1. The plate lifter 66, it will be recalled, reciprocates in the vertically disposed guideways 67. The lifter comprises the plate engaging member 290, a carrier 291 therefor reciprocating in the guideways 67, the plate engaging member being movable on its carrier, first to permit the cast plate $x$ to pass it, and then to get on the underside of the straight edge of the plate $x$ to lift it ready for delivery. The lifter 66 also comprises means or devices for effecting the described relative movements between the lifter and its carrier.

As embodied, the carrier for the plate lifter proper 290 comprises a slide 291, mounted to reciprocate in the two vertically disposed guides 67, which guides are mounted, as stated, on the machine frame. This slide is shown as having two side arms 292 and 293, which slide in the guideways 67, and a cross connecting piece 294, at the bottom end. This cross-piece is provided with lugs 295 and 296, to which the actuating rod 69 is pivotally connected at 68.

The plate lifter 290 is pivotally mounted at its lower end in the slide by means of a pin 297 (Figs. 16, 18 and 19). The lifter proper 290, near the upper end of the side members of the slide has at each side bearing lugs 298 and 299, which keep it in position within the slide. Mounted on the lifter 290, near the bottom end is a lug 300, internally apertured to receive a pin 301, which pin is pivotally mounted in a lug 302, fixed to the cross-piece 294 of the slide. Coiled about pin 301 is a spring 303, in compression between the two lugs 300 and 302, and impelling the plate lifter 290 inwardly or to the right in Fig. 16.

Means are provided for holding the plate lifter 290 out, or to the left in Fig. 16, while the cylinder 1, with the cast plate $x$ is rotating from casting position to plate delivering position. As embodied, a rod 306 projects from the side of the plate lifter 290, and it is provided with a cam roller 307.

Pivotally mounted on the machine frame is a switch cam 308, the cam being fixed on a shaft 309, journaled in the machine frame at 310. A spring 311 is coiled about shaft 309, with one end thereof fixed to the machine frame and the other end thereof fixed to a collar 312, fixed on shaft 309. The spring impels the switch cam into the position shown in full lines in Fig. 16.

In the operation of the device, as the plate lifter 290 moves downwardly from the full line position of Fig. 16 (after the plate $x$ has been conveyed away from the core 1), it moved downwardly to the dotted line position in Fig. 16. During this downward movement of the plate lifter 290, the roller 307 will run on the outside of the switch cam 308, the plate lifter 290 being thereby rocked away from the cylinder 1.

At the end of the downward movement of the plate lifter 290, the roller 307 will come below the switch cam 308, as indicated in dotted line position in Fig. 16. In the meantime the newly cast plate $x$ has been rotated with cylinder 1 from casting position on the under side of the cylinder 1 to the plate delivery position on the top side of the cylinder. During such movement of the plate $x$, due to roller 307 rolling on the outside of cam 308, the plate lifter 290 is in the retracted position. On the succeeding upward movement of the plate lifter 290, the roller 307 is below the switch cam 308, as indicated in dotted lines in Fig. 16. From this position roller 307 passes inside or beneath the switch cam 308, and the plate lifter 290 will come up beneath the straight edge of the plate $x$ as shown in Fig. 16, and the plate will be lifted into position to be removed by the conveyor 85.

It will be understood that departures may be made from the details of invention as herein embodied and described, within the scope of the appended claims, without departing from the principles of the invention and without sacrificing its chief advantages.

What is claimed is:

1. A machine for operating on stereotype printing plates including in combination means for holding a curved stereotype plate stationary and means traveling within the concave part of the plate to trim a straight edge thereof.

2. A machine for operating on stereotype printing plates including in combination means for holding a curved stereotype plate having a riser on a straight edge thereof and cutting means traveling within the concave part of the plate to cut off the riser and to trim the inside of the plate.

3. A machine for operating on hemi-cylindrical stereotype printing plates including in combination a device for cutting the straight edge of the curved plate, said device comprising a straight cutting edge mounted to move in the concave part of the plate and means for moving said device in a straight line to effect the cutting action.

4. A machine for operating on hemi-cylindrical stereotype printing plates including in combination a device mounted to move within the concave part of the plate for cutting the straight edge of the plate, said device comprising a straight cutting edge, means for holding the plate stationary during the cutting operation, and means for moving said device in a straight line to effect the cutting action, said cutting edge being disposed at an angle to the direction of travel of the device.

5. A machine for operating on hemi-cylindrical stereotype printing plates including in combination a device for cutting the straight edge of the curved plate, said device comprising a straight cutting edge means for effecting relative movement between the plate and said device in a straight line to effect the cutting action and means for simultaneously trimming the inside, concave part of the plate.

6. A machine for operating on stereotype printing plates including in combination means for supporting a semi-cylindrical stereotype plate, a pair of cutters mounted to move within the concave portion of the plate and adapted to simultaneously cut the straight edges of the plate and means for effecting relative movement between the plate and the knives.

7. A machine for operating upon stereotype printing plates including in combination means for supporting a semi-cylindrical stereotype plate, a pair of cutters mounted to move within the concave portion of the plate and adapted to simultaneously cut the straight edges of the plate, means for holding the plate stationary during the cutting operation, and means for moving the knives along the plate to cut the straight edges thereof.

8. A machine for operating upon stereotype printing plates including in combination means for supporting at rest a semi-cylindrical stereotype plate, a carriage provided with a knife for cutting a straight edge of the plate and mounted to reciprocate in the concave part of the plate when held by said supporting means.

9. A machine for operating upon stereotype printing plates including in combination normally stationary gripping means for supporting at rest a semi-cylindrical stereotype plate, a reciprocating carriage provided with a pair of knives for cutting both the straight edges of the plate and means on the reciprocating carriage for actuating the gripping means.

10. A machine for operating upon stereotype printing plates including in combination means for supporting a semi-cylindrical stereotype plate and an arcuate cutter traveling within and longitudinally of the plate to shave the arcuate ribs on the interior of the plate.

11. A machine for operating upon stereotype printing plates including in combination means for supporting a semi-cylindrical stereotype plate, cutter traveling within and longitudinally of the plate to shave the interior of the the plate and a simultaneously operated cutter for cutting the longitudinal edges of the plate.

12. A machine for operating upon stereotype printing plates including in combination means for supporting a semi-cylindrical stereotype plate, an arcuate cutter traveling within and longitudinally of the plate to shave the interior of the plate, and means to reciprocate the cutter past the plate supporting means.

13. A machine for operating upon stereotype stereotype printing plates including in combination means for supporting a semi-cylindrical stereotype plate, an arcuate cutter traveling within and longitudinally of the plate to shave the interior of the plate, and means for effecting relative movement between the plate and cutter longitudinally of the plate.

14. A machine for operating upon stereotype printing plates including in combination means for supporting a semi-cylindrical plate, a cutter for the straight edge of the plate, an arcuate cutter for the interior of the plate and means for effecting relative movement between the cutters and the plate.

15. A machine for operating upon stereotype printing plates including in combination means for supporting a semi-cylindrical plate, a cutter for the straight edge of the plate, an arcuate cutter for the interior of the plate, cutting longitudinally of the plate, and means for effecting relative movement simultaneously between both cutters and the plate.

16. A machine for operating upon stereotype printing plates including in combination means for supporting a semi-cylindrical plate, a cutter for the straight edge of the plate, an arcuate cutter for the interior of the plate, means for effecting relative movement between the cutters and the plate including a carriage on which the cutters are mounted and means for effecting relative movement between the carriage and the plate.

17. A machine for operating upon steretotype printing plates including in combination means for supporting a semi-cylindrical plate, a cutter for the straight edge of the plate, an arcuate cutter for the interior of the plate, means for effecting relative movement between the cutters and the plate including a carriage on which the cutters are mounted and means for reciprocating the carriage past the plate.

18. A machine for operating upon stereotype printing plates including in combination means for supporting a semi-cylindrical plate, a cutter for the straight edge of the plate, an arcuate cutter for the interior of the plate, means for effecting relative movement between the cutters and the plate, and a saddle for carrying away the trimmed plate.

19. A machine for operating upon stereotype printing plates including in combination means for supporting a semi-cylindrical plate, a cutter for the straight edge of the plate, an arcuate cutter for the interior of the plate cutting longitudinally of the plate, means for effecting relative movement between the cutters and the plate, and a saddle for carrying away the trimmed plate.

20. A machine for operating upon stereotype printing plates including in combination means for supporting a semi-cylindrical plate, a cutter for the straight edge of the plate, an arcuate cutter for the interior of the plate, means for effecting relative movement between the cutters and the plate including a carriage on which the cutters are mounted, means for effecting relative movement between the carriage and the plate, and a saddle mounted on the carriage for conveying away the trimmed plate.

21. A machine for operating upon stereotype printing plates including in combination means for supporting a semi-cylindrical plate, means for automatically delivering a plate to said support, a cutter for the straight edge of the plate, an arcuate cutter for the interior of the plate, and means for effecting relative movement between the cutters and the plate.

22. A machine for operating upon stereotype printing plates including in combination means for supporting a semi-cylindrical plate, means for automatically delivering a plate to said support, a cutter for the straight edge of the plate, an arcuate cutter for the interior of the plate cutting longitudinally of the plate, and means for effecting relative movement between the cutters and the plate.

23. A machine for operating upon stereotype printing plates including in combination means for supporting a semi-cylindrical plate, means for automatically delivering a plate to said support, a cutter for the straight edge of the plate, an arcuate cutter for the interior of the plate, means for effecting relative movement between the cutters and the plate including a carriage on which the cutters are mounted, and means for effecting relative movement between the carriage and the plate.

24. A machine for operating upon stereotype printing plates including in combination means for supporting a semi-cylindrical plate, means for automatically delivering a plate to said support, a cutter for the straight edge of the plate, an arcuate cutter for the interior of the plate, means for effecting relative movement between the cutters and the plate, including a carriage on which the cutters are mounted and means for reciprocating the carriage past the plate.

25. A machine for operating upon stereotype printing plates including in combination means for supporting a semi-cylindrical plate, means for automatically delivering a plate to said support, two cutters, one for each of the straight edges of the plate, an arcuate cutter for the interior of the plate and means for effecting relative movement between all the cutters simultaneously and the plate.

26. A machine for operating upon stereotype printing plates including in combination means for supporting a semi-cylindrical plate, means for automatically delivering a plate to said support, two cutters, one for each of the straight edges of the plate, an arcuate cutter for the interior of the plate cutting longitudinally of the plate, and means for effecting relative movement between all the cutters simultaneously and the plate.

27. A machine for operating upon stereotype printing plates including in combination means for supporting a semi-cylindrical plate, means for automatically delivering a plate to said support, two cutters one for each of the straight edges of the plate, an arcuate cutter for the interior of the plate, and means for effecting relative movement between the cutters and the plate including a carriage on which the cutters are mounted and means for effecting relative movement between the carriage and the plate.

28. A machine for operating upon stereotype printing plates including in combination means for supporting a semi-cylindrical plate, means for automatically delivering a plate to said support, two cutters, one for each of the straight edges of the plate, an arcuate cutter for the interior of the plate, and means for effecting relative movement between the cutters and the plate, including a carriage on which the cutters are mounted and means for reciprocating the carriage past the plate.

29. A machine for operating upon stereotype printing plates, including in combination means for supporting a semi-cylindrical plate, means for automatically delivering a plate in said support, a cutter for the straight edge of the plate, an arcuate cutter for the interior of the plate, means for effecting relative movement between the cutters and the plate, and a saddle for carrying away the trimmed plate.

30. A machine for operating upon stereotype printing plates including in combination means for supporting a semi-cylindrical plate, means for automatically delivering a plate to said support, a cutter for the straight edge of the plate, an arcuate cutter for the interior of the plate, means for effecting relative movement between all the cutters simultaneously and the plate, and a saddle for carrying away the trimmed plate and delivering it to a cooling station.

31. A machine for operating upon stereotype printing plates including in combination means for supporting a semi-cylindrical plate, means for automatically delivering a plate to said support, a cutter for the straight edge of the plate, an arcuate cutter for the interior of the plate cutting longitudinally of the plate, means for effecting relative movement between the cutters and the plate, and a saddle for carrying away the trimmed plate.

32. A machine for operating upon stereotype printing plates including in combination means for supporting a semi-cylindrical plate, means for automatically delivering a plate to said support, a cutter for the straight edge of the plate, an arcuate cutter for the interior of the plate cutting longitudinally of the plate, means for effecting relative movement between all the cutters simultaneously and the plate, and a saddle for carrying away the trimmed plate and delivering it to a cooling station.

33. A machine for operating upon stereotype printing plates including in combination means for supporting a semi-cylindrical plate, means for automatically delivering a plate to said support, a cutter for the straight edge of the plate, an arcuate cutter for the interior of the plate, means for effecting relative movement between the cutters and the plate, including a carriage on which the cutters are mounted, means for effecting relative movement between the carriage and the plate, and a saddle mounted on the carriage for conveying away the trimmed plate.

34. A machine for operating upon stereotype printing plates including in combination a trimming station, means for clamping a semi-cylindrical plate at the trimming station and means movable within the concave part of the plate for cutting the straight edges thereof.

35. A machine for operating upon stereotype printing plates including in combination a trimming station, means for clamping a semi-cylindrical plate at the trimming station, means for cutting the straight edges of the clamped plate and means for simultaneously trimming the interior of the plate.

36. A machine for operating upon stereotype printing plates including in combination a trimming station, means for clamping a semi-cylindrical plate at the trimming station, means for cutting the straight edges of the clamped plate, and means traveling longitudinally of the plate for simultaneously trimming the interior of the plate.

37. A machine for operating upon stereotype printing plates including in combination a trimming station, means for clamping a semi-cylindrical plate at the trimming station, means for cutting the straight edges of the clamped plate, and means traveling longitudinally of the plate including an arcuate shaving knife for simultaneously trimming the interior of the plate.

38. A machine for operating upon stereotype printing plates including in combination a trimming station, means for clamping a semi-cylindrical plate at the trimming station, means for cutting the straight edges of the clamped plate, means for receiving the plate after the straight edges are cut and conveying it away from the trimming station.

39. A machine for operating upon stereotype printing plates including in combination a trimming station, means for clamping a semi-cylindrical plate at the trimming station, means for cutting the straight edges of the clamped plate, means for receiving the plate after the straight edges are cut, and conveying it away from the trimming station to a cooling station, and the cooling station for receiving the plate.

40. A machine for operating upon stereotype printing plates including in combination means for supporting a semi-cylindrical stereotype plate and an arcuate cutter travelling within and longitudinally of the plate to shave the arcuate ribs on the interior of the plate, a saddle for receiving the shaved plate, a cooling station, and means for conveying the saddle and plate to the cooling station and delivering the plate thereto.

41. In a stereotype plate finishing machine, the combination of means for holding a curved stereotype plate, and cutting means for simultaneously trimming the inner concave side of the plate, and a longitudinal edge thereof.

42. In a stereotype plate finishing machine, the combination of means for holding a curved stereotype plate, and cutting means for simultaneously trimming the inner concave side of the plate, and both longitudinal edges.

43. In a stereotype plate finishing machine, the combination of means for holding a curved stereotype plate, and cutting means located to move within the concave portion of the plate for simultaneously trimming the inner concave side of the plate, and a longitudinal edge thereof.

44. In a stereotype plate finishing machine, the combination of means for holding a curved stereotype plate, and cutting means located to move within the concave portion of the plate for simultaneously trimming the inner, concave side of the plate, and both longitudinal edges.

45. A machine for operating on stereotype printing plates including in combination means for holding a curved stereotype plate stationary and means traveling within the concave part of the plate to trim a straight edge thereof and a longitudinally disposed guide along which said trimming means reciprocates in its travel.

46. In a stereotype plate finishing machine, the combination of means for holding a curved stereotype plate, and cutting means for simultaneously trimming the inner concave side of the plate, and a longitudinal edge thereof and a longitudinally disposed guide along which said trimming means reciprocates in its travel.

47. In a stereotype plate finishing machine, the combination of means for holding a curved stereotype plate, and cutting means for simultaneously trimming the inner concave side of the plate, and a longitudinal edge thereof, said trimming devices being mounted on the same carrying member, and means for reciprocating said carrier to trim the plate.

48. In a stereotype plate finishing machine, the combination of means for holding a curved stereotype plate, and cutting means for simultaneously trimming the inner concave side of the plate, and a longitudinal edge thereof, said trimming devices being mounted on the same carrying member, means for reciprocating said carrier to trim the plate and a longitudinally disposed guide along which said carrier is reciprocated.

49. In a stereotype plate finishing machine, the combination of means for holding a curved stereotype plate, including devices pressing against the straight longitudinal edges thereof, and cutting means for simultaneously trimming the inner concave side of the plate, and a longitudinal edge thereof.

50. In a stereotype plate finishing machine, the combination of means for holding a curved stereotype plate, including devices pressing against the straight longitudinal edges thereof, and cutting means for simultaneously trimming the inner concave side of the plate, and a longitudinal edge thereof and a longitudinally disposed guide along which said trimming means reciprocates.

51. In a stereotype plate finishing machine, the combination of means for holding a curved stereotype plate, and cutting means for simultaneously trimming the inner concave side of the plate, and both longitudinal edges, said cutting means comprising a cutter for a longitudinal edge at either side and an arcuate cutter located between said longitudinal edge cutters.

52. In a stereotype plate finishing machine, the combination of means for holding a curved stereotype plate, and cutting means for simultaneously trimming the inner concave side of the plate, and both longitudinal edges, said cutting means comprising a cutter for a longitudinal edge at either side and an arcuate cutter located between said longitudinal edge cutters, and a longitudinally disposed guide along which said cutting means reciprocates.

53. In a stereotype plate finishing machine, the combination of means for holding a curved stereotype plate, and cutting means for simultaneously trimming the inner concave side of the plate, and both longitudinal edges, said cutting means comprising a cutter for a longitudinal edge at either side and an arcuate cutter located between said longitudinal edge cutters, and a longitudinally disposed guide located between said longitudinal edge cutters along which said cutting means reciprocates.

54. In a stereotype plate finishing machine, the combination of means for holding a curved stereotype plate, including devices pressing against the straight longitudinal edges of the plate, and cutting means for simultaneously trimming the inner concave side of the plate, and both longitudinal edges, said cutting means comprising a cutter for a longitudinal edge at either side and an arcuate cutter located between said longitudinal edge cutters and a longitudinally disposed guide located between said longitudinal edge cutters along which said cutting means reciprocates.

55. In a stereotype plate finishing machine in combination means for holding a curved stereotype plate including devices for holding the printing surface of the plate firmly against the curved surface of the trimming mechanism, cutting means for simultaneously trimming the inner concave side of the plate and both longitudinal edges, including a reciprocating member carrying two longitudinal edge cutters and an arcuate cutter located between them, and a longitudinally disposed guideway along which said cutters reciprocate in their travel.

56. A stereotype plate finishing machine including in combination means for supporting a semi-cylindrical stereotype plate and clamping it firmly against the arch of the trimming mechanism, an arcuate cutter traveling within and longitudinally of the plate, longitudinally disposed guiding and supporting means on the opposite side of the cutter from the stereotype plate, and means for reciprocating the cutter along said guiding and supporting means to trim the plate.

57. A machine for operating on stereotype printing plates including in combination means for holding a curved stereotype plate stationary and means traveling within the concave part of the plate to trim a straight edge thereof and means operating automatically at the end of the trimming stroke to reverse the direction of travel of the trimming means.

58. A machine for operating upon stereotype printing plates including in combination means for supporting a semi-cylindrical stereotype plate and an arcuate cutter travelling within and longitudinally of the plate to shave the arcuate ribs on the interior of the plate and means operating automatically at the end of the trimming stroke to reverse the direction of travel of the trimming means.

THE GOSS PRINTING PRESS CO.,
*Assignee of Joseph J. Walser, Deceased,*
By J. A. RIGGS,
*Vice President.*